United States Patent [19]

Fortmann et al.

[11] Patent Number: 4,848,408
[45] Date of Patent: Jul. 18, 1989

[54] MULTI-LAYER COMPENSATOR WITH SPACERS ARRANGED BETWEEN THE LAYERS

[75] Inventors: Manfred Fortmann, Overath; Siegbert Lehmann, Alsdorf, both of Fed. Rep. of Germany

[73] Assignee: Internationale Atomreaktorbau GmbH, Bergisch Gladbach, Fed. Rep. of Germany

[21] Appl. No.: 633,081

[22] Filed: Jul. 23, 1984

Related U.S. Application Data

[63] Continuation of Ser. No. 362,441, Mar. 26, 1982.

[30] Foreign Application Priority Data

Apr. 10, 1981 [DE] Fed. Rep. of Germany ....... 3114620

[51] Int. Cl.$^4$ ............ F16L 55/00; F16L 9/14
[52] U.S. Cl. ................... 138/104; 138/121; 138/148; 376/286; 376/292
[58] Field of Search ............ 376/285, 291, 292, 900, 376/286, 416, 417; 138/177, 138, 28, 148, 121, 122; 220/439

[56] References Cited

U.S. PATENT DOCUMENTS

| 2,975,115 | 3/1961 | Wigner et al. | |
| 3,089,520 | 5/1963 | Huet | 138/138 |
| 3,183,022 | 5/1965 | Sayag | |
| 3,714,971 | 2/1973 | Venable, Jr. | 138/143 |
| 3,809,128 | 5/1974 | Tateisi et al. | 138/148 X |
| 4,095,937 | 6/1978 | Colburn et al. | 138/150 X |
| 4,098,298 | 7/1978 | Vohrer | 138/122 |
| 4,151,012 | 4/1979 | Simkovich et al. | 138/177 X |

FOREIGN PATENT DOCUMENTS 1281423 7/1972 United Kingdom .

Primary Examiner—John S. Maples
Attorney, Agent, or Firm—Herbert L. Lerner; Laurence A. Greenberg

[57] ABSTRACT

Multi-layer compensator with spacers arranged between the layers and with the spacers having the shape of flat strips distributed parallel to the longitudinal axis of the compensator over the circumference, with a gap between spacers.

3 Claims, 1 Drawing Sheet

MULTI-LAYER COMPENSATOR WITH SPACERS ARRANGED BETWEEN THE LAYERS

This application is a continuation of application Ser. No. 362,441, filed 3/6/82 pending.

BACKGROUND OF THE INVENTION

1. Field of the Invention

The present invention relates to a compensator and more particularly refers to a new and improved multi-layer compensator, the interspaces of which can be monitored, suitable for use in nuclear power plants.

2. Description of the Prior Art

Compensators are known components to compensate for thermal expansions in piping. Compensators constructed from several closely spaced layers which permit a certain amount of shift between them are used if the ability to expand and the life of the compensator bellows are to be increased, while the properties (for instance, the pressure strength) are to remain unchanged from single-layer compensators. If there is a medium inside the bellows, the escape of which must be prevented, monitoring the individual layers for leaks becomes increasingly important. This can be done in known manner in that between the different spaces so formed, pressure differences are maintained, and a change of pressure differences can give indications of leaks. To make it easier for the individual layers to slide on each other, they are made of sheet metal with the least possible surface roughness. It was found that the then remaining very thin gap does not permit gas transport within acceptable periods of time. It has been proposed to arrange a wire screen as a spacer between the individual layers to increase the size of the gap. However, excessive local pressure occurs, whereby notches are caused in the sheet metal pieces which can be the starting point for the later formation of leaks. The jamming of the wires in the notches furthermore inhibits the shift between the individual layers, and thereby, the ability to expand is considerably reduced. Consequently, the decisive advantage of the multi-layer compensator over the single-layer one would get is lost. Also, when testing the compensator by means of the well-known eddy current testing method, the wires running in the circumferential direction has a disturbing effect.

Additional problems arise if the compensator is to be used in high-temperature nuclear power plants, in which, for instance, helium with slight hydrogen contamination circulates at temperatures up to 950° C. In particular, the danger then exists that the individual layers are joined together by friction welding and the compensator thereby loses its ability to expand.

A method familiar to those skilled in the art as "heterogeneous gaseous-phase reaction" is further known, by means of which very uniform, strongly adhering smooth oxide layers can be applied. Such oxide layers are not attacked by hydrogen and rather prevent it and its isotopes deuterium and tritium, from penetrating them.

SUMMARY OF THE INVENTION

An object of the present invention is to provide a multi-layer compensator which is suitable for use in nuclear power plants of the type mentioned and the interspaces of which can be monitored for the possible presence of the medium contained in the interior of the compensator. In addition, it should be possible to test the compensator by means of the eddy current method without particular difficulty.

With the foregoing and other objects in view, there is provided in accordance with the invention a multilayer compensator with spacers arranged between the layers, and with the spacers having the shape of flat strips distributed parallel to the longitudinal axis of the compensator over the circumference, with a gap between spacers.

Other features which are considered as characteristic for the invention are set forth in the appended claims.

Although the invention is illustrated and described herein as embodied in a multi-layer compensator with spacers arranged between the layers, it is nevertheless not intended to be limited to the details shown, since various modification may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
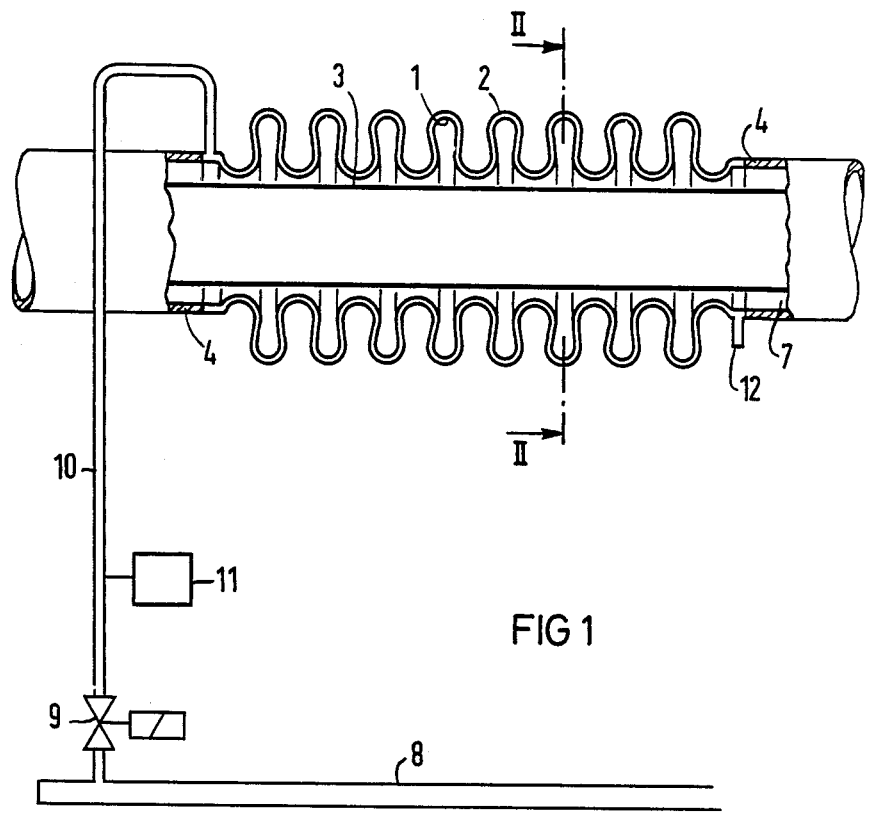
FIG. 1 diagrammatically illustrates a two-layer compensator, i.e. the compensator has an inner carrying tube with the intermediate space between the inner layer and the tube filled with hot helium at high pressure, spacers which are flat strips are distributed parallel to the longitudinal axis of the compensator over the circumference with a space between layers to monitor the pressure to determine if there is a leak or excessive pressure.
Figure 2:
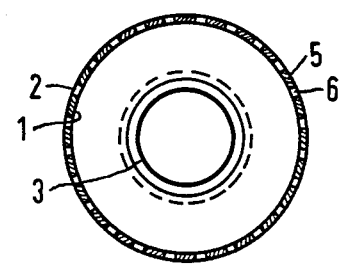
FIG. 2 is a cross section of the compensator taken along line II—II of FIG. 1.

Through the use of strips with substantially a real contact with the adjacent layers of the compensator, the pressure is reduced to the point that notching becomes impossible and more favorable sliding properties are obtained. By the arrangement parallel to the longitudinal axis as well as by the small height of the strips (in the order of a few tenths of a millimeter), the disturbing influence on the testing operation according to the eddy current method which is customarily carried out in the circumferential direction is to a large extent reduced. Gaps which permit a rapid transport of the fluid, remain between the strips, so that fluids that may get into them from the interior due to overpressure or underpressure, are fed to appropriate detectors.

The shortening of the strips at the ends of the compensator such that at least one circular ring gap is produced makes possible the application of an annular gap which connects the gaps between the individual strips with each other.

Strips consisting of a steel with a chromium content of more than 20%, and coated with a chromium oxide layer ensure proper sliding of the strips on the adjacent layers and prevent friction welding, especially in an oxygen-containing atmosphere, since chromium binds oxygen molecules at its surface. An embodiment example of the invention is shown in the drawings.

The compensator consists of an inner layer 1 and an outer layer 2. A gas-carrying tube 3 can be installed, for instance, inside the compensator and the space between the tube and the inner layer 1 may be filled with hot helium at a pressure of, for example 45 bar. The compensator has straight welding ends 4 at its ends. Welding ends 4 likewise consist of an inner and an outer layer, in order to facilitate its connection to the adjacent parts of the installation. Sheet metal strips 5 of a steel having a high chromium content with a coating of chromium oxide, and having the cross section dimensions, for instance, of 0.3×5 mm, are arranged between the inner layer 1 and the outer layer 2 and distributed over the circumference and parallel to the longitudinal axis of the compensator. Gaps 6 between the strips 5 are in communication with each other via an annular gap 7 at each of the welding ends 4. The space between the inner layer 1 and the outer layer 2 can be connected via a spur line 10 which can be shut off by means of a valve 9 to a compressed-air line 8 with a pressure of, for instance, 2.5 bar. A pressure pickup and evaluation device 11 monitors the pressure in this inbetween space, it being no doubt advisable to provide compensation devices, for instance, for changing ambient temperatures. If a leak occurs in the inner layer 1, it is noted by a rise of the pressure measured by the measuring device 11. If, on the other hand, a leak occurs in the outer layer 2, the pressure measured there drops accordingly to near atmospheric pressure. It has been found that the proposed coating of the strips 5 in connection with an oxygen-containing atmosphere also aids in preventing friction welding at high temperaturese of the inner layer 1 to the outer layer 2. Notches, which are detrimental to the long-term strength, are not produced when these different materials slide on each other. The gas permeability of the gaps 6 can be checked by opening a normally closed additional stub 12.

The foregoing is a description corresponding to German Application No. P 31 14 620.1, dated Apr. 10, 1981, International priority of which is being claimed for the instant application, and which is hereby made part of this application. Any discrepancies between the foregoing specification and the aforementioned corresponding German application are to be resolved in favor of the latter.

We claim:

1. Multilayer bellows compensator structure extending along a longitudinal axis with interspaces to compensate for thermal expansions in piping and to monitor the interspaces, comprising a corrugated, flexible tube, said tube having an outer circular layer and a spaced concentric inner layer with fluid in the space between the two layers, a plurality of spaced, individual spacers disposed in the space between the two spaced layers, said individual spacers are each as one solid piece with a rectangular cross section and with a width large as compared to its thickness, said individual spacers distributed over the circumference of the inner layer and extending parallel to the longitudinal axis of the compensator, each space between individual spacers forming a gap between such spacers to permit a rapid transport of the fluid content therein to the ends of the compensator, and connecting means to the gaps to monitor the fluid content therein.

2. Compensator according to claim 1, wherein the spacers are shortened at the ends of the compensator such that at least one circular ring gap is produced, and an opening in the circular ring gap for connection to a monitoring device.

3. Compensator according to claim 1 or claim 2, wherein
   (a) the spacers consist of a steel with a chromium content of more than 20%, and
   (b) the spacer surface is coated with a chromium oxide layer.

* * * * *